Aug. 14, 1928.
R. P. LANSING
ENGINE STARTER
Filed March 29, 1926
1,680,557
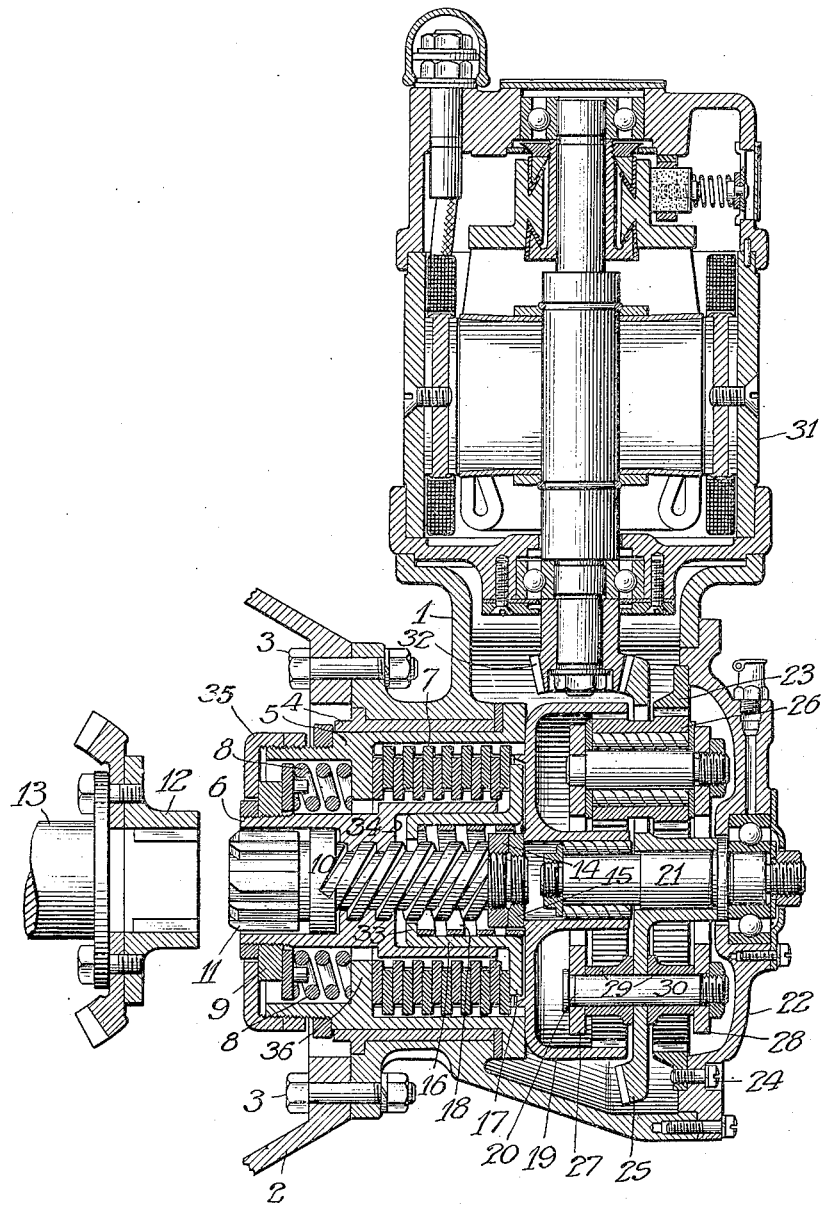
Witness
Martin H. Olsen.
Inventor
Raymond P. Lansing
By Rector, Hibben, Davis & Macauley
His Attys.

Patented Aug. 14, 1928.

1,680,557

UNITED STATES PATENT OFFICE.

RAYMOND P. LANSING, OF MONTCLAIR, NEW JERSEY, ASSIGNOR TO ECLIPSE MACHINE COMPANY, OF ELMIRA, NEW YORK, A CORPORATION OF NEW YORK.

ENGINE STARTER.

Application filed March 29, 1926. Serial No. 98,153.

My invention relates to engine starting apparatus for the starting of engines, such as internal combustion engines, and more particularly but not necessarily airplane engines, and the object thereof is to provide a simple, efficient and reliable apparatus which in the present instance is shown as operated by power, such as by an electric motor. The object of my invention is to provide a simple, efficient and reliable apparatus for the purpose stated and characterized more particularly by the provision of a friction clutch which is combined with the drive proper and whose pressure is governed by the drive in its operation.

The figure in the accompanying drawing is a sectional elevation of an apparatus embodying my invention and illustrates the use of an electric motor as the actuating means of the drive and its reduction gearing.

My apparatus comprises a drive proper including a driving member which is adapted to engage a member of the engine to be started, and also reduction means combined with such drive proper and operated in suitable manner and by suitable means such as an electric motor as herein shown.

First describing the drive proper, the same is located within a main casing 1 which is suitably supported as by being detachably connected with the crankcase 2 of the engine in suitable manner as by means of the bolts 3. Within a bushing 4 in the casing, there rotates a driving barrel 5 and a shell or nut 6 concentrically arranged therewithin and providing a considerable annular space between them to receive a yieldable driving connection which is here in the form of a friction clutch 7. This clutch is composed of two sets of clutch plates or disks which are splined respectively to the interior of the barrel and the exterior of the shell. A series of coil springs 8 are located in a part of such annular space and their pressure is regulated by the adjustable nut 9 screwing onto the outer end of the shell or nut.

The nut 6 is internally threaded to receive the corresponding threads of a screw shaft 10 which constitutes the main portion of the driving member whose other principal portion is an engaging head 11 having longitudinal splines to engage corresponding splines in the interior of the sleeve 12 which constitutes a part of the engine member, here shown as the crank shaft 13. The outer end of the screw shaft is provided with a stop nut 14 and a lock nut 15.

The nut 6 is formed at its outer end as a shell to whose exterior one set of the clutch plates is splined and within which is mounted a sleeve 16 having a marginal flange 17 which is adapted to bear against the right-hand end of the clutch plates. A coil spring 18 is contained within the sleeve 16 and is adapted to hold such sleeve towards the left and to thereby apply its pressure upon such clutch plates, but rather lightly.

Next describing the reduction gearing, the same includes a rotatable gear 19 which is secured to the barrel 5 as at 20. Such reduction gearing also includes a rotatable shaft 21 having its bearings in the hub of the gear 19 and in the cover plate 22 of the casing 1 and also in the hub of the stationary gear 23 which is secured to such cover plate in suitable manner as by means of the screws 24. A rotatable gear 25 is mounted upon the shaft 21 and carries the planetary gearing including the series of planetary pinions, one of which is shown at 26 and also including the parallel plates 27 and 28 which form a frame for such pinions and are spaced apart by the spacers 29 and studs 30.

The means for actuating the apparatus is here shown as an electric motor 31 whose armature shaft is provided with a bevel pinion 32 meshing with the bevel gear 25.

Describing a cycle of operation and assuming that the actuating means is an electric motor, when the motor is energized the pinion 32 will be rotated thereby rotating the gear 25, the planetary gearing including the gear 19 and consequently rotating the driving barrel 5 from which the torque is transmitted through friction clutch 7 to the shell or nut 6. By reason of the rotation of this nut, the screw shaft or driving member is automatically advanced longitudinally to the left and into the socket of the engine member or sleeve 12 with which it becomes engaged. When such longitudinal movement ceases, the torque of the motor will be transmitted through the mechanism described to the crank shaft 13 which is thereby rotated and the engine is thereby cranked. When the engine operates under its own power, the driving member will be automatically disengaged by reason of the screw thread action between it and the nut 6.

Towards the end of the longitudinal movement of the driving member to the left, its stop nut 14 will contact the inturned flange 33 of the sleeve 16 and continued torque transmitted through the clutch then clamps the flange 33 against the shoulder 34 of the nut 6, the gap between them being thereby taken up. Thereupon, there comes into action the springs 8, which had not been exerting any pressure upon the clutch plates, but which are normally restrained between the barrel and the end cap 35 screw threaded upon such barrel the only pressure that is centrally applied to such plates being that furnished by the light coil spring 18. When the flange 33 and shoulder 34 became clamped together, the nut 6 moved to the right with respect to the clutch pack and as it so moved to the right the ring 9 lifted the pressure of the springs 8 away from the end cap 35 which is screw threaded upon the outer end of the barrel 5, forming a gap or clearance between such ring 9 and the inner face of the cap 35. The pressure of the springs 8 now abuts at one end the left-hand face of the flange 36 in the interior of the barrel and at the other end against the ring 9, tending to force the latter to the left. This spring pressure is transmitted to the nut 6 to the screw shaft 10 to the stop nut 14, to the flange 33, to the flange 17, and thence to the opposite or right-hand side of the clutch pack, thereby transmitting the pressure of the springs 8 onto the clutch plates. In other words, the action of the screw and nut in taking up the gap between the flange 33 and shoulder 34 transposes the gap between the ring 9 and cap 35, thus transferring the spring pressure which was normally constrained between the flange 36 and the cap 35 over to a new position, that is from the flange 36 to the flange 17. The function of the springs 18 is to insure initial play contract of the clutch plates.

I claim:

1. In an engine starter, a drive including a driving member mounted for longitudinal movement to engage a member of the engine to be started and for rotary movement to crank such engine member, a control member cooperating with the driving member for controlling its longitudinal and rotary movements, an actuating member, a friction clutch forming the driving connection between the control member and the actuating member, and means governed by the driving member for increasing the friction of such clutch in the cranking operation.

2. In an engine starter, a drive including a driving member mounted for longitudinal movement to engage a member of the engine to be started and for rotary movement to crank such engine member, a control member cooperating with the driving member for controlling its longitudinal and rotary movements, an actuating member, a friction clutch forming the driving connection between the control member and the actuating member, and means actuated by the driving member in its longitudinal movement for applying pressure to such clutch.

3. In an engine starter, a drive including a driving member mounted for longitudinal movement to engage a member of the engine to be started and for rotary movement to crank such engine member, a control member cooperating with the driving member for controlling its longitudinal and rotary movements, an actuating member, a friction clutch forming the driving connection between the control member and the actuating member, said clutch comprising two sets of plates which are drivingly connected respectively with the control member and the actuating member, means for applying a fixed amount of pressure to such plates, and means governed by the driving member for applying an increased amount of pressure thereto.

4. In an engine starter, a drive including a driving member mounted for longitudinal movement to engage a member of the engine to be started and for rotary movement to crank such engine member, a control member cooperating with the driving member for controlling its longitudinal and rotary movements, an actuating member, a friction clutch forming the driving connection between the control member and the actuating member, said clutch comprising two sets of plates which are drivingly connected respectively with the control member and the actuating member, springs for applying a fixed amount of pressure to such plates, and unyielding means governed by the driving member for applying an increased amount of pressure thereto.

5. In an engine starter, a drive including a driving member mounted for longitudinal movement to engage a member of the engine to be started and for rotary movement to crank such engine member, a control member cooperating with the driving member for controlling its longitudinal and rotary movements, an actuating member, a friction clutch forming the driving connection between the control member and the actuating member, said clutch comprising two sets of plates which are drivingly connected respectively with the control member and the actuating member, and a pressure applying member cooperating with said plates and having a portion disposed in the path of movement of the driving member whereby an increased amount of pressure is applied to the plates.

6. In an engine starter, a drive including a driving member mounted for longitudinal movement to engage a member of the engine to be started and for rotary movement to crank such engine member, a control member cooperating with the driving member for controlling its longitudinal and rotary movements, an actuating member, a friction clutch forming the driving connection between the control member and the actuating member, said clutch comprising two sets of plates which are drivingly connected respectively with the control member and the actuating member, and a sleeve surrounding the driving member and having at one end a marginal external flange cooperating with the plates and at the other end a marginal internal flange arranged in the path of movement of the driving member whereby an increased amount of pressure is applied to the plates.

7. In an engine starter, a drive including a driving member mounted for longitudinal movement to engage a member of the engine to be started and for rotary movement to crank such engine member, a control member cooperating with the driving member for controlling its longitudinal and rotary movements, an actuating member, a friction clutch forming the driving connection between the control member and the actuating member, said clutch comprising two sets of plates which are drivingly connected respectively with the control member and the actuating member, and a sleeve surrounding the driving member and having at one end a marginal external flange cooperating with the plates and at the other end a marginal internal flange arranged in the path of movement of the driving member whereby an increased amount of pressure is applied to the plates, and a spring for positioning such sleeve.

8. In an engine starter, a drive including a rotatable driving barrel, a rotatable shell arranged concentric within the barrel, a friction clutch forming the torque transmitting connection between the barrel and shell, a driving member mounted within and actuated by the shell for longitudinal movement into engagement with a member of the engine to be started and for rotary movement to crank the engine, and means interposed in the path of longitudinal movement of the driving member to apply pressure to such clutch.

9. In an engine starter, a drive including a rotatable driving barrel, a rotatable shell arranged concentric within the barrel, a friction clutch forming the torque trainsmitting connection between the barrel and shell, a driving member mounted within and actuated by the shell for longitudinal movement into engagement with a member of the engine to be started and for rotary movement to crank the engine, and means interposed in the path of longitudinal movement of the driving member to apply pressure to such clutch, such means comprising a sleeve fitting within said shell and having flanges cooperating respectively with the clutch and the driving member.

10. In an engine starter, a drive including a rotatable driving barrel, a rotatable shell arranged concentric within the barrel, a friction clutch forming the torque transmitting connection between the barrel and shell, a driving member mounted within and actuated by the shell for longitudinal movement into engagement with a member of the engine to be started and for rotary movement to crank the engine, and means interposed in the path of longitudial movement of the driving member to apply pressure to such clutch, such means comprising a sleeve fitting within the shell and cooperating with the clutch and driving member, and a spring for positioning the sleeve into contact with the clutch.

11. In an engine starter, a drive including a rotatable driving barrel, a rotatable shell arranged concentric within the barrel, a friction clutch forming the torque transmitting connection between the barrel and shell, a shaft mounted within the shell and threaded thereto for longitudinal movement into engagement with a member of the engine to be started and for rotary movement to crank the engine, and means interposed in the path of longitudinal movement of the driving member to apply pressure to such clutch.

12. In an engine starter, a drive including a rotatable driving barrel, a rotatable shell arranged concentric within the barrel, a friction clutch forming the torque transmitting connection between the barrel and shell, a shaft mounted within the shell and threaded thereto for longitudinal movement into engagement with a member of the engine to be started and for rotary movement to crank the engine, and a sleeve fitting within the shell and having a flange extending therebeyond and into contact with such clutch and having a second flange in the path of longitudinal movement of such shaft.

13. In an engine starter, a drive including a driving member mounted for movement to engage a member of the engine to be started and for movement to crank such engine member, a control member cooperating with the driving member for controlling its engaging movement and its cranking movement, an actuating member, a friction clutch forming the driving connection between the control member and the actuating member, and means governed by the driving member for increasing the friction of such clutch in the cranking operation.

In testimony whereof, I have subscribed my name.

RAYMOND P. LANSING.